United States Patent [19]

Inoue et al.

[11] Patent Number: 4,887,877
[45] Date of Patent: Dec. 19, 1989

[54] OPTICAL DEVICES AND OPTICAL INTEGRATED CIRCUITS

[75] Inventors: Hiroaki Inoue, Hachioji; Shinji Sakano, Kokubunji; Hitoshi Nakamura, Kanagawa; Toshio Katsuyama, Hachioji; Hiroyoshi Matsumura, Saitama, all of Japan

[73] Assignee: Hitachi, Ltd., Tokyo, Japan

[21] Appl. No.: 285,367

[22] Filed: Dec. 15, 1988

Related U.S. Application Data

[63] Continuation of Ser. No. 916,704, Oct. 8, 1986, abandoned.

[30] Foreign Application Priority Data

Oct. 9, 1985 [JP] Japan .................................. 60-223709
Dec. 11, 1985 [JP] Japan .................................. 60-276762

[51] Int. Cl.⁴ .......................... G02F 1/00; G02F 1/19; G02F 1/29; H01S 3/101
[52] U.S. Cl. .................................. 350/96.11; 350/96.13
[58] Field of Search ................. 350/96.11, 96.13, 96.14

[56] References Cited

U.S. PATENT DOCUMENTS 4,679,893 7/1987 Ramer .............................. 350/96.13

OTHER PUBLICATIONS

H. F. Schlaak et al., "Integrated Optical Oscillators and Their Applications," Optics Communications, vol. 36, No. 3, Feb. 1, 1981, pp. 186–188.

E. Garmire, "Moving Toward Integrated Optics," Laser Focus, Oct., 1975, pp. 55–59.

Primary Examiner—John Zazworsky
Attorney, Agent, or Firm—Antonelli, Terry & Wands

[57] ABSTRACT

An optical device and an optical integrated circuit which incorporate an optical switch and have a novel function. Light sources are respectively coupled to two input ends of an X-type 2×2 optical switch, and light receivers are respectively coupled to two output ends of the optical switch, thereby obtaining an optical device which is capable of performing both AND and OR logics. A light source is coupled to one input end of an optical switch, and a light receiver is provided at one output end from which the light emitted from the light source emerges when no electric power is supplied to the optical switch, whereby it is possible to construct a system in which, even when one terminal has a power failure, there is no hindrance to other terminals. If an optical switch is arranged such as to use driving electric power as a modulating signal, the optical switch can serve as a modulator in which the output from one output end can be employed to monitor a modulated optical signal. In addition, if the optical switch is formed into, e.g., a carrier injection type optical switch using a semiconductor, the above-described devices can be fabricated as integrated circuit.

29 Claims, 4 Drawing Sheets

FIG. 1
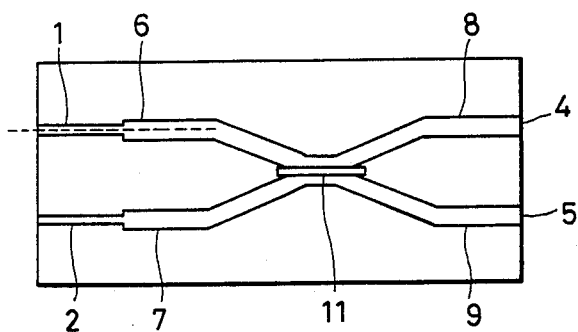
FIG. 2
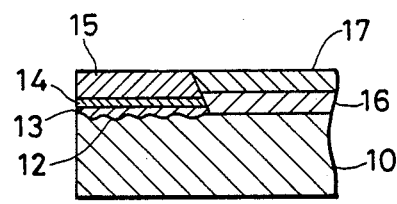
FIG. 3
| a | b |  | AND |  | a |  | b |  | EX-OR |  | OR |  | NOR |  | E NOR |  | NOT (b) |  | NOT (a) |  | NAND |  |
|---|---|---|---|---|---|---|---|---|---|---|---|---|---|---|---|---|---|---|---|---|---|---|
| 1 | 1 | 0 | 1 | 0 | 1 | 0 | 1 | 0 | 1 | 0 | 1 | 0 | 1 | 0 | 1 | 0 | 1 | 0 | 1 | 0 | 1 |
| 1 | 0 | 0 | 0 | 1 | 1 | 0 | 0 | 1 | 1 | 0 | 0 | 1 | 1 | 0 | 0 | 1 | 1 | 0 | 0 | 1 | 1 |
| 0 | 1 | 0 | 0 | 0 | 0 | 1 | 1 | 1 | 1 | 0 | 0 | 0 | 0 | 1 | 1 | 1 | 1 | 1 | 1 | 1 | 1 |
| 0 | 0 | 0 | 0 | 0 | 0 | 0 | 0 | 0 | 0 | 1 | 1 | 1 | 1 | 1 | 1 | 1 | 1 | 1 | 1 | 1 | 1 |

| L₁ | L₂ | S | P₁ | P₂ |
|----|----|---|----|----|
| 1  | 0  | 1 | 1  | 0  |
| 1  | 0  | 0 | 0  | 1  |
| 0  | 0  | 1 | 0  | 0  |
| 0  | 0  | 0 | 0  | 0  |

| L₁ | L₂ | S | P₁ | P₂ |
|----|----|---|----|----|
| 1  | 1  | 1 | 1  | 1  |
| 1  | 1  | 0 | 1  | 1  |
| 0  | 1  | 1 | 0  | 1  |
| 0  | 1  | 0 | 1  | 0  |

OPTICAL DEVICES AND OPTICAL INTEGRATED CIRCUITS

This application is a continuation of application Ser. No. 916,704, filed on Oct. 8, 1986.

BACKGROUND OF THE INVENTION

The present invention relates to optical logic devices which perform logic with optical signals. More particularly, the present invention pertains to optical logic devices of reduced length which exchange AND and OR circuit function using one of the optical signals as a control signal. The present invention is also concerned with a light source for modulation suitably employed for a optical logic device and, more particularly, to a light source for modulation which is suitable for external modulation and which is integrated with a semiconductor laser, a semiconductor optical switch or a semiconductor light receiver for monitoring.

As is well known, the basic calculations performed in present electronic computers are 2 variable and 2 value logic in which 16 different kinds of result such as those shown in the truth table in FIG. 3 may be output with respect to values (0, 1) of two input signals a and b. This logic is used as the basic element when a more complicated logic is performed, and in such case all the complicated logic can be performed using the AND, OR and NOT basic logic. Accordingly, to arrange an optical computer which performs optical logic with optical signals, it is essential to realize an optical logic device which is capable of performing the above-described logic. However, a typical conventional optical logic device is arranged such that one light-emitting element and an optical switch are combined in such a manner as to obtain logic outputs of EX-NOR and EX-OR on the basis of two electrical signals, and no consideration has heretofore been taken for the technique of obtaining the logic outputs of AND and OR, which are basics of more complicated logic, by means of devices having the same arrangement.

Optical switches which have heretofore been proposed include one type which employs the deflection of light using the acoustooptic effect and/or electro-optic effect and another type in which the coupling coefficient of a directional coupler is changed using the electrooptic effect. Examples of materials which have large acoustooptic effect and/or electrooptic effect include $LiNbO_3$ and PLZT. These materials are, however, different in terms of the crystal system from a compound semiconductor which constitutes a laser or a light receiver. It has, therefore, heretofore been impossible to form such material on the same substrate together with the above-described device in a monolithic structure, and it is necessary, when employing an external modulator, to first collimate the light emerging from a semiconductor laser and then allow the light to enter the external modulator, which involves troublesome and time-consuming operations such as alignment of optical axes and fixing optical elements. In addition, it is necessary to cope with the reflection of light from the external modulator and an optical element for collimating the light. In order to solve these problems, integration of an absorption type external modulator has already been tried. However, this integrated external modulator undesirably changes wavelength. As a part of formation of an integrated circuit, a technique of fabricating a laser and a light-receiving element for monitoring light as a signal in a monolithic structure has been examined. When the absorption type modulator is integrated, it is necessary to separate modulated light by means of an optical system when monitoring a modulated signal.

The present invention provides an optical logic device which comprises: an optical switch having two input ends and two output ends and adapted to allow at least the light entering one input end to emerge from any desired one of the output ends through one of the two optical guides which are switched over from one to the other by changing the refractive index at the intersection region between the optical guides in response to an applied signal; and two light-emitting elements which are respectively coupled to the two input ends, whereby AND and OR circuits are selectively formed. More specifically, referring to FIG. 4 which shows the fundamental concept of the present invention, when an optical switch 3 is OFF, the light which is emitted from a light-emitting element 1 and enters an optical guide 6 is allowed to emerge from an output end 5 through an optical guide 9, whereas the light which is emitted from a light-emitting element 2 and enters an optical guide 7 is allowed to emerge from an output end 4 through an optical guide 8. When the optical switch 3 is ON, the light from the light-emitting element 1 which enters the optical guide 6 is allowed to emerge from the output end 4 through the optical guide 8, whereas the light from the light-emitting element 2 which enters the optical guide 7 is allowed to emerge from the output end 5 through the optical guide 9. In addition, the light-emitting elements 1 and 2 are respectively represented by $L_1$ and $L_2$, while the ON state of the optical switch 3, which is denoted by S, is represented by "1", and the OFF state of the switch 3 is represented by "0". The output ends 4 and 5 are respectively represented by $P_1$ and $P_2$, and when light emerges from either $P_1$ or $P_2$, this state is represented by "1", whereas, when no light emerges therefrom, this state is represented by "0". FIGS. 5 and 6 are truth tables showing the above-described various states. Thus, when $L_2$ is OFF, an AND logic output defined by a logic signal guided by $L_1$ and S is obtained from $P_1$, whereas, when $L_2$ is ON, an OR logic output represented by a logic signal guided by $L_1$ and S is obtained from $P_2$.

In the prior art, since a material for an optical switch is different in terms of the crystal system from a compound semiconductor which is a material for a semiconductor laser, it has heretofore been impossible to integrate together a semiconductor laser and an optical switch, and an optical switch and a monitoring light receiver could not be formed in a monolithic integrated structure. In view of these circumstances, we have developed an optical switch recognizing the fact that the supply of current through a compound semiconductor causes a change in refractive index in the vicinity of the absorption wavelength due to a transition between bands. Thus, it becomes possible to fabricate a semiconductor laser and an optical switch from compound semiconductors in the same system. When an optical switch, a semiconductor laser and a light receiver are actually formed in a monolithic structure using an InP crystal as a substrate and an InGaAsP crystal as an active layer or an optical guide, the following advantages are obtained. Since the optical guide is formed in the same process and at the same time as the above-described optical elements, an advantageously high coupling efficiency is obtained in contrast to hybrid optical coupling, and since there is no boundary between different materials, the problem of reflection is eliminated, and it is possible to obtain reliability with respect to changes in external environments. It has heretofore been difficult, when effecting external modulation, to monitor a modulated signal and set a light-receiving system because the light emerging from a semiconductor laser in the opposite direction is not modulated. However, it becomes possible to effect monitoring easily by employing an optical switch as a modulator and by forming the optical switch from a material in the same crystal system as a material for a semiconductor laser and a light receiver with a different forbidden band amount, i.e. bandgap energy. In addition, since the optical switch according to the present invention has two input ends, if semiconductor lasers are respectively fabricated for these two input ends, even when one semiconductor laser fails, it can be replaced with the other, which means that it is possible to improve the yield of the device as a modulation light source and obtain redundancy of the light source of the system. Two lasers can be coupled to one optical switch in the same step in which one laser is fabricated in the process of forming an optical integrated circuit.

As described above, the optical logic device according to the present invention comprises: an optical switch having two input ends and two output ends and adapted to allow at least the light entering one input end to emerge from any desired one of the output ends by switching the output ends from one to the other in response to an applied signal; and two light-emitting elements which are respectively coupled to the two input ends. Thus, it is possible to obtain an optical logic device which has a reduced size, i.e., a length of 1 mm or less, and which can perform both AND and OR functions which are basic logics functions, so that it is possible to simply the arrangement of an optical logic and optical information processing system.

According to the present invention, the following various advantages are obtained.

Since the external modulator is fabricated on the same substrate together with the light-emitting elements, (1) there are no reflecting end faces, and (2) it is possible to allow the light emitted from the light-emitting elements to enter the external modulator with an increased efficiency. In addition, the reflection of light from the input ends of the external modulator is prevented, and it is therefore possible to eliminate one of the causes of feedback noise due to reflection.

The present invention enables a monitoring light receiver to be readily coupled to the external modulator.

The present invention further enables two lasers to be readily produced and coupled to the optical modulator (optical switch). It is therefore possible to keep a relatively high production yield of modulation integrated circuits with respect to a relatively low production yield of laser. When two lasers are operated, it is possible to increase the degree of redundancy of the system.

BRIEF DESCRIPTION OF THE DRAWINGS

FIG. 1 is a plan view of one embodiment of the optical logic device according to the present invention;

FIG. 2 is a sectional view taken along the broken line in FIG. 1;

FIG. 3 is a truth table showing the results of the 2 variable and 2 value logic;

FIG. 7b is a sectional view of the integrated circuits shown in FIG. 7a;

FIG. 8b is a sectional view of the integrated circuit shown in FIG. 8a;

DETAILED DESCRIPTION OF THE PRESENTLY PREFERRED EMBODIMENTS

Figures 4, 5, 6:
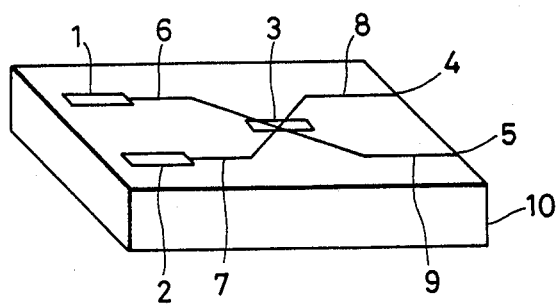
FIG. 4 shows the basic concept of an optical logic device.
FIGS. 5 and 6 are truth tables showing the results of calculation performed by the optical logic element shown in FIG. 4.

FIG. 1 is a plan view of one embodiment of the optical logic device according to the present invention, and FIG. 2 is a sectional view taken along the broken line in FIG. 1. In this embodiment, as shown in FIG. 1, an X-type 2×2 reflecting optical switch 11 and distributed feedback lasers 1 and 2 are monolithically integrated on a semi-insulator InP substrate 10. After a grating 12 has been fabricated on the substrate 10, an active layer 13 of InGaAsP, a guide layer 14 of InGaAsP and an InP layer 15 are epitaxially grown by liquid phase epitaxy (LPE). Then, the above-described multi-layer crystal layer except for the laser regions 1 and 2 is removed by etching, and multi-layer epitaxial growth is effected by LPE for the purpose of fabricating an optical switch 11 having an optical guide 16 defined by the InGaAsP layer and a cap layer 17 defined by the InP layer. After the region except for the laser regions 1, 2, the optical switch 11 and optical guides 6, 7, 8 and 9 has been selectively etched, InP, which has a smaller refractive index than InGaAsP, is epitaxially grown in the regions except for the optical guides, thereby preparing an optical logic device having three-dimensional optical guides as shown in FIG. 1. The optical switch 11 in this embodiment is arranged such that current is supplied to a region for reflection of the optical switch 11 which is provided at the intersection between the light guides 6, 7, 8 and 9 to inject carriers, and the light passing through the optical guides is reflected or allowed to travel straight forward by turning the supply of current ON or OFF, thus effecting a switching operation. In this embodiment, the angle of intersection between the optical guides (the angle made between the optical guides 6 and 7 or 8 and 9) at the optical switch 11 is set at 7°, while the width of each optical guide was set at 10 $\mu$m, and the spacing between the lasers 1 and 2 is set at 50 $\mu$m. The size of the device under these conditions is about 0.1 mm×1 mm. Although in this embodiment the optical logic device is fabricated using a carrier injection type reflecting optical switch, it is possible to further increase the intersection angle and minimize the device size since the change in refractive index caused by carrier injection is extremely large.

It is a matter of course that any optical switch which has two input ends and two output ends (e.g., a directional coupler optical switch) can be employed as an optical switch in the logic device according to the present invention.

The optical device shown in FIG. 1 can also be prepared employing the following optical elements. The optical switch is defined by a directional coupler optical switch (the extinction ratio: 20dB) having a substrate made of LiNbO$_3$, the light-emitting elements by InP semiconductor lasers (the oscillation wavelength: 1.5 μm; the oscillation power: 4 mw), and the light receiver by a Ge avalanche photodiode (the received quantum efficiency: 30%). The result has confirmed that the transmission and reception by a terminal formed using the device according to the present invention as a main component can be effected at high speed, i.e., 200 Mbit/s. It has also been confirmed that, at the time of a power failure, there is no adverse effect on optical signals in relation to the network except for the occurrence of an insertion loss of 1 dB in this device.

Figure 7A:
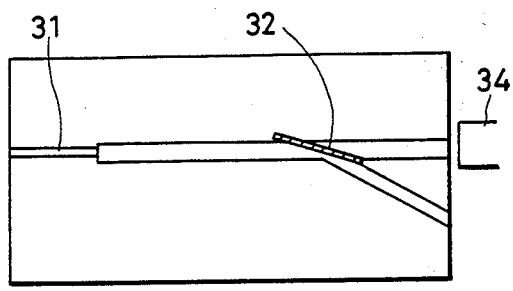
FIG. 7a is a plan view of an integrated circuit composed of a DFB laser and an optical switch using InGaAsP as an optical guide.
Figure 7B:
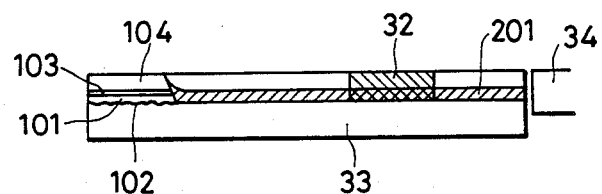

Referring to FIGS. 7a and 7b, a diffraction grating 102 is fabricated on an InP substrate 33, and an active layer 101 of InGaAsP, a guide layer 103 of InGaAsP and an InP layer 104 are epitaxially grown thereon to form a compound substrate. Then, the multi-layer epitaxial layer for the laser is removed, and multi-layer epitaxial growth for an optical switch having an optical guide formed from InGaAsP is carried out. After the DFB laser region and the region other than the optical guides of the optical switch region having been simultaneously etched, INP, which has a lower refractive index than InGaAsP, is epitaxially grown in the regions other than the optical guides. In addition, an impurity (e.g., Zn) is doped into a reflection region 32 of the optical switch which is indicated by oblique lines in FIG. 7a so that injection current flows through the region 32 concentratively. Since there in no emergent end face, the light emerging from the DFB laser can be coupled to the optical guide 201 of the optical switch with increased efficiency. When no current is supplied to the region 32 of the optical switch, the light emerging from the laser is allowed to travel straight forward so as to enter an optical fiber 34, whereas, when current is supplied to the region 32, the laser beam is reflected from the region 32 and propagated through another optical guide, so that no light enters the optical fiber 34.

Figure 8A:
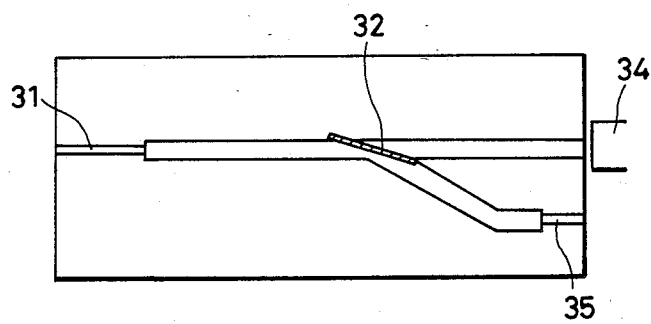
FIG. 8a is a plan view of an integrated circuit composed of a DFB laser, an optical switch and a light receiver.
Figure 8B:
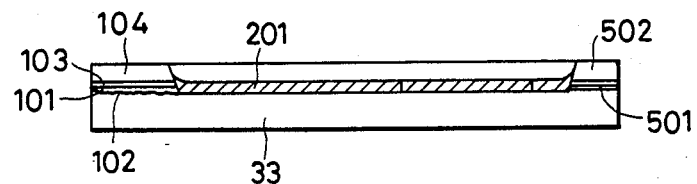

Referring to FIGS. 8a and 8b, the multi-layer epitaxial layer of the semiconductor laser can be employed as a multi-layer film for a light receiver region. However, since the diffraction grating on the InP substrate causes feedback noise due to reflection, no grating is fabricated in this region 501, above which is the InP layer 502. Thereafter, a reflection region 32 of the optical switch is fabricated in accordance with a procedure similar to that in the previous embodiment. Although it has heretofore been difficult to monitor a signal in external modulation, it is possible, according to the present invention, to facilitate monitoring of external modulation by simultaneously fabricating a light receiver semicondcutor 35 at one output end of the optical switch. However, when light is incident on the optical fiber 34, no light enters the light receiver, and the states of "0" and "1" of a signal transmitted to the optical fiber 34 are "1" and "0" for the light receiver.

Figure 9:
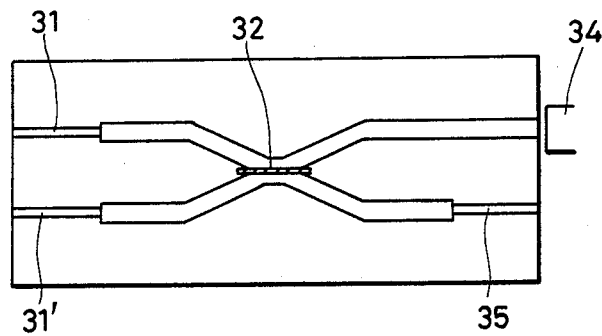
FIG. 9 is a plan view of an integrated circuit composed of two DFB lasers, a transposition optical switch and a light receiver.

FIG. 9 is a plan view of an integrated device obtained by fabricating two DFB lasers 31, 31', a transposition optical switch 32, a monitoring light receiver 35 and an optical switch 32 and a monitoring light receiver 35 on the same substrate. The production procedure is the same as that described above for the other embodiments. The feature of this integrated device resides in utilization of both input ends and both output ends of the optical switch. The DFB lasers (31, 31') are simultaneously fabricated for the two input ends, respectively, in the same process, together with the light receiver 35. For this reason, even when the number of DFB lasers increases, no additional process is needed. By virtue of this arrangement, (1) it is possible to minimize losses in the production yield of integrated devices which may caused by a relatively low production yield of DFB lasers, and (2) in the case where two lasers are operated, even when one laser has a failure in use of the integrated circuit incorporated in a system, it can be replaced with the other laser.

Figure 10:
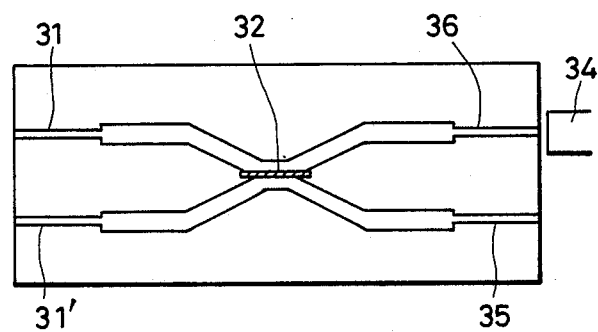
FIG. 10 is a plan view of an integrated circuit composed of two DFB lasers, a transposition optical switch, a light receiver and an optical amplifier.

FIG. 10 is a plan view of an integrated circuit obtained by fabricating two DFB lasers 31, 31', a transposition optical amplifier 36 on the same substrate. The production procedure is similar to that in the immediately preceding embodiment, and the fabrication of the amplifier is effected at the same time and in accordance with the same procedure as the fabrication of the light receiver. The amplifier is activated by supplying current forward through the p-n junction. Since the amplifier is fabricated simultaneously with the fabrication of the other elements, no extra production step is needed, and it is possible to obtain a larger output than the output of a laser when used alone.

Further, in the aforementioned embodiments, n$^+$-InP or P$^+$-InP is used as the substrate.

What is claimed is:

1. An optical logic device comprising an X-type 2×2 reflecting optical switch having two input ends and two output ends; two light-emitting elements operatively coupled to respective said input ends of said optical switch; and means for selectively allowing light entering at least one of said input ends from respective light-emitting elements to emerge from at least one of said output ends in response to a signal applied to said optical switch, wherein optical guides fabricated on a semiconductor substrate couple said light-emitting elements to said input ends and form a region of intersection having a variable refractive index with said optical switch, whereby said means varies the refractive index of at least a part of said region in response to the signal applied to said optical switch, and said light-emitting elements and said optical switch are monolithically integrated on the semiconductor substrate.

2. An optical logic device according to claim 1, wherein the signal applied to said optical switch and light from one of said light-emitting elements allows the device to make an AND operation when the other of said light-emitting elements emits no light.

3. An optical logic device according to claim 1, wherein the signal applied to said optical switch and light from both of said light-emitting elements allows the device to make an OR operation.

4. An optical logic device according to claim 1, wherein said light-emitting elements are distributed feedback lasers.

5. An optical logic device according to claim 4, wherein said lasers and said optical switch are monolithically integrated on a semiconductor substrate on which a diffraction grating has been fabricated.

6. An optical logic device according to claim 5, wherein optical guides are fabricated on said substrate to coupled said lasers to said input ends of said optical switch, whereby said optical guides are defined by an InGaAsP guide layer and an InP cap layer and said substrate is in InP substrate.

7. An optical logic device according to claim 1, wherein optical guides fabricated on a semiconductor substrate couple said light-emitting elements to said input ends and form a region of intersection of at least about 7° with said optical switch.

8. An optical logic device according to claim 1, wherein said optical switch has a LiNbO$_3$ substrate.

9. An optical logic device according to claim 1, wherein said light-emitting elements are InP semiconductor lasers.

10. An optical logic device according to claim 1, wherein a light-receiving element is operatively located at one of said output ends and receives light from said light-emitting elements when no signal is applied to said optical switch.

11. An optical integrated device comprising:
a compound semiconductor substrate;
means for emitting light constituted by a compound semiconductor monolithically integrated on said substrate;
an optical modulator constituted of a compound semiconductor in a crystal system the same as that of said substrate and having a variable refractive index;
an optical guide fabricated on said substrate so as to have a region of intersection with said optical modulator; and
means for switching light emitted from said light-emitting means at said region of intersection by varying the refractive index thereat by means of a signal applied to said optical modulator.

12. An optical integrated device according to claim 11, wherein said optical modulator has a forbidden band of different magnitude from a forbidden band of said light-emitting means.

13. An optical integrated device according to claim 11, wherein said optical guide is a compound semiconductor in a crystal system the same as that of said optical modulator and substrate.

14. An optical integrated device according to claim 11, wherein said optical modulator has two output ends, and a light-receiving element is monolithically integrated on said substrate at one of said output ends.

15. An optical integrated device according to claim 14, wherein said light-receiving element is a compound semiconductor in a crystal system the same as that of said optical modulator and substrate.

16. An optical integrated device according to claim 14, wherein said optical modulator has two input ends, said light-emitting means being operatively coupled to said input ends.

17. An optical integrated device according to claim 14, wherein an optical amplifier is operatively located at one of said output ends.

18. An optical integrated device according to claim 14, wherein said light-receiving element is operative to receive light from said light-emitting element when no signal is applied to said optical modulator.

19. An optical integrated device according to claim 14, wherein said substrate is provided with a diffraction grating except in the region of said light-receiving element.

20. An optical integrated device according to claim 11, wherein said optical modulator includes a transposition optical switch.

21. An optical integrated device according to claim 11, wherein said light-emitting means is at least one distributed feedback laser.

22. An optical logic device performing two variable-two value logic comprising:
a plurality of input ends for taking in light emitted from a plurality of light emitting elements;
a plurality of output ends for taking out the light;
a plurality of optical guides for connecting the input ends with the output ends; and
an intersection region of the optical guides for switching the taken in light in accordance with an applied signal,
wherein the two variable-two value logic comprises a logic signal of the applied signal and a logic signal of one of the light emitting elements.

23. An optical logic device according to claim 22, wherein the intersection region includes a reflection type optical switch.

24. An optical logic device according to claim 22, wherein the light emitting elements are distributed feedback lasers.

25. An optical logic device according to claim 24, wherein the intersection region includes a reflection type optical switch and has a refractive index variable in response to the applied signal.

26. An optical logic device comprising:
first and second input ends for taking in light emitted from first and second light emitting elements, respectively;
first and second output ends for taking out the emitted light;
a plurality of optical guides for connecting the input ends with the output ends; and
an intersection region of the optical guides for switching the light in accordance with an applied signal, wherein an AND logic output defined by logic signals of the applied signal and the first light emitting element is obtained from the first output end when the second light emitting element is OFF, and a OR logic output defined by logic signals of the first light emitting element and the applied signal is obtained from the second output end when the second light emitting element is ON.

27. An optical logic device according to claim 26, wherein the intersection region includes a reflection type optical switch.

28. An optical logic device according to claim 26, wherein the light emitting elements are distributed feedback lasers.

29. An optical logic device according to claim 28, wherein the intersection region includes a reflection type optical switch and has a refractive index variable in response to the applied signal.

* * * * *